US011089546B2

(12) United States Patent
Ayoub (10) Patent No.: US 11,089,546 B2
(45) Date of Patent: Aug. 10, 2021

(54) INVENTORY TRACKING TAGS, SYSTEM AND METHOD FOR PROLONGING BATTERY LIFE

(71) Applicant: BlackBerry Limited, Waterloo (CA)

(72) Inventor: Sameh Ayoub, Ottawa (CA)

(73) Assignee: BlackBerry Limited, Waterloo (CA)

( * ) Notice: Subject to any disclaimer, the term of this patent is extended or adjusted under 35 U.S.C. 154(b) by 303 days.

(21) Appl. No.: 16/143,606

(22) Filed: Sep. 27, 2018

(65) Prior Publication Data

US 2020/0107264 A1 Apr. 2, 2020

(51) Int. Cl.
| | | |
|---|---|---|
| H04W 52/02 | (2009.01) | |
| H04W 4/02 | (2018.01) | |
| H04W 4/029 | (2018.01) | |
| H04W 4/80 | (2018.01) | |
| G06K 19/07 | (2006.01) | |

(52) U.S. Cl.
CPC .... *H04W 52/0229* (2013.01); *G06K 19/0705* (2013.01); *H04W 4/029* (2018.02); *H04W 4/80* (2018.02); *H04W 52/0212* (2013.01)

(58) Field of Classification Search
None
See application file for complete search history.

(56) References Cited

U.S. PATENT DOCUMENTS

| | | |
|---|---|---|
| 2008/0231449 A1 | 9/2008 | Moshfeghi |
| 2010/0141430 A1 | 6/2010 | Steer |
| 2013/0336287 A1* | 12/2013 | Abraham .......... H04W 36/0066 370/331 |
| 2014/0187261 A1* | 7/2014 | Lee .......................... G01S 19/34 455/456.1 |
| 2014/0257888 A1 | 9/2014 | Yi et al. |
| 2015/0080020 A1* | 3/2015 | Edge ...................... H04W 24/10 455/456.1 |
| 2016/0088482 A1 | 3/2016 | Zeiler et al. |
| 2016/0321897 A1* | 11/2016 | Lee .......................... H04W 4/80 |
| 2017/0195848 A1* | 7/2017 | Korneluk .............. H04W 48/16 |

OTHER PUBLICATIONS

EPO: Extended European Search Report relating to EP application No. 19199442.5 dated Nov. 11, 2019.
EPO: EP Office Action relating to EP application No. 19199442.5, dated Oct. 15, 2020.

* cited by examiner

*Primary Examiner* — Scott M Sciacca
(74) *Attorney, Agent, or Firm* — Rowand LLP (57) ABSTRACT

Devices and methods for prolonging battery life of an inventory tracking tag. The tag determines its location and reports to remote server over a cellular data connection using the cellular communication subsystem. The remote server assesses whether the tag is within range of a short-range communication network, such as a WiFi network, and sends an instruction message over the cellular data connection to instruct the tag to use the first short-range communication network. The instruction message may include credentials for connecting to the network. The tag disables the cellular communication subsystem, enables the short-range communication subsystem, and requests a connection to the first short-range communication network for the purpose of sending future location reports to the remote server.

10 Claims, 4 Drawing Sheets

INVENTORY TRACKING TAGS, SYSTEM AND METHOD FOR PROLONGING BATTERY LIFE

FIELD

The present application generally relates to inventory tracking tags and a system and method for prolonging battery life of deployed tags.

BACKGROUND

Small wireless passive or active transponders are commonly used to track inventory items. These transponders, often referred to as "tags", may be simple passive RFID stickers that respond to polling signals in some cases. In other cases, the tags may be battery-powered active communications devices. In many inventory tracking systems, the tags are configured to determine their location and send a periodic report containing location data to an inventory tracking server.

One of the principal design concerns with inventory tracking tags is battery life. To reduce size, weight and cost, batteries are ideally small; however, the life and reliability of the tag is based on having ample battery power. Electronics and functions that drain battery power need to be minimized to preserve and prolong the life of a battery-powered inventory tracking tag.

It would be advantageous to provide for systems and methods of inventory tracking that provide an improved battery life for inventory tracking tags.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In a first aspect, the present application describes a method of prolonging battery life of an inventory tracking tag. The tag may include a battery, a position detection subsystem, a cellular communication subsystem, and a short-range communication subsystem. The method may include receiving, at a remote server, a report from the inventory tracking tag containing location data regarding the location of the inventory tracking tag; determining at the remote server, based on the location data and stored data regarding short-range communication networks coverage areas, that the inventory tracking tag is located within a first coverage area of a first short-range communication network; and sending an instruction message to the inventory tracking tag instructing the inventory tracking tag to cease using its cellular communication subsystem and to initiate use of its short-range communication subsystem to report further location data via the first short-range communication network.

In another aspect, the present application describes a method of prolonging battery life of an inventory tracking tag. The tag may include a battery, a position detection subsystem, a cellular communication subsystem, and a short-range communication subsystem. The method may include determining location data regarding the location of the inventory tracking tag using the position detection subsystem; transmitting the location data to a remote server over a cellular data connection using the cellular communication subsystem; receiving an instruction message over the cellular data connection from the remote server, the instruction message including information identifying a first short-range communication network; and in response to the instruction message, disabling the cellular communication subsystem, enabling the short-range communication subsystem, and requesting a connection to the first short-range communication network for the purpose of sending future location reports to the remote server.

In yet a further aspect, the present application describes a server for tracking inventory through tracking the locations of a plurality of inventory tracking tags, the inventory tracking tags each including a battery, a position detection subsystem, a cellular communication subsystem, and a short-range communication subsystem. The server may include a data communications interface coupled to at least one cellular communication network and a plurality of short-range communication networks; one or more processors; and memory storing processor-executable instructions. When executed, the instructions may cause the one or more processors to receive a report from a first inventory tracking tag containing location data regarding the location of the first inventory tracking tag, determine, based on the location data and stored data regarding short-range communication networks coverage areas, that the first inventory tracking tag is located within a first coverage area of a first short-range communication network; and send an instruction message to the first inventory tracking tag instructing the first inventory tracking tag to cease using its cellular data communication subsystem and to initiate use of its short-range communication subsystem to report further location data via the first short-range communication network.

In yet a further aspect, the present application provides an inventory tracking tag. The tag may include a battery; a position detection subsystem to determine location data regarding the location of the inventory tracking tag; a cellular communication subsystem to transmit the location data to a remote server over a cellular data connection and to receive an instruction message from the remote server, the instruction message including information identifying a first short-range communication network; a short-range communication subsystem; and a controller to, in response to the instruction message, disable the cellular communication subsystem, enable the short-range communication subsystem, and cause the short-range communication subsystem to connect to the first short-range communication network for the purpose of sending future location reports to the remote server.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Modern inventory tracking often involves attaching an electronic transponder (also referred to as a "tag") to goods. The tag includes a position detection capability and a wireless communication capability. The tag is typically an active transponder having a battery. In operation, the tag determines its location or position, such as using a Global Positioning System (GPS) chip, triangulation of cellular or other wireless signals, or any other location determining process, and it then reports that location wirelessly. Depending on the application and the complexity of the tag, some tags report additional sensor data, such as temperature, humidity, door close/open events, cargo status, etc.

Some tags are simple passive RFID devices that rely on backscatter modulation to transmit identifying information back to a reader that powers the tag with a continuous wave signal. However, tags that are capable of determining location, such as using GPS or similar techniques, typically require a local power source, like a battery.

In some cases, the tags are configured to report location data in response to a query or polling signal from a reader. In some cases, the tags are configured to report location data periodically based on a local clock. The time between reports may be hardcoded or may vary depending on whether the tag determines it has changed location recently. That is, it may send more frequent reports of location data when it determines that it has moved than if it has been stationary.

In any of these cases, the battery constrains tag cost, size and weight. Another counterbalancing consideration is the power consumption of the tag, as a battery that is too small will run out of power too quickly. Accordingly efficient use of battery power is a concern with respect to inventory tracking tags. Power may be conserved through using a sleep mode between transmissions of location data. Nevertheless, power consumption and battery life remain a concern, particularly for tags that may have small batteries if they are expected to have a long service life and remain reliable.

Cellular communications, even if infrequent, require significant power in searching for available cellular connectivity, obtaining a channel, and transmitting data. However, lower power short-range communications, like ISM band communications such as WiFi, Bluetooth, RFID, etc., are typically associated with small coverage areas and are inappropriate or unavailable for inventory location tracking outside of a constrained area.

The present application notes that equipping a tag with both cellular and short-range communications capabilities may assist with power usage. To avoid having the inventory tracking tag store the credentials for access all potential short-range communication networks, the inventory tracking tag may be configured to detect an available short-range communication network and then ask a remote server via a cellular data connection for the appropriate credentials for accessing the short-range communication network. The remote server may then look up the credentials, confirm that the inventory tracking tag is entitled to use the short-range communication network, and then transmit the credentials to the inventory tracking tag. In some cases, the remote server may contact the short-range communication network and provide it with the identity of the inventory tracking tag and instructions to allow the inventory tracking tag to gain access and connect to the short-range communication network.

In one aspect, the present application notes that if the tag is regularly using its short-range communications subsystem to search for available short-range connectivity, then it may drain the battery more quickly than simply relying on cellular communications. In accordance with some aspects of the present application, a solution may be provided based on tag location data. The tag regularly reports its location data to a remote server. The remote server may store, or may have access to, short-range communications network information, such as coverage area information. This enables the remote server to perform the operation of assessing whether the tag should attempt to switch from cellular communications to short-range communications, thereby eliminating the power consumption on the tag due to scanning for available short-range communication networks in circumstances in which no such network is likely available. Moreover, the remote server may maintain information regarding the identities of available and suitable short-range networks, including login credentials, thereby unburdening the inventory tracking tag from storing such data and from having to perform regular updates to its stored information regarding short-range communication networks and associated credentials. With national or international range inventory tracking, the quantity of short-range communications networks that may be encountered in a typically inventory travel path may be very large and may change frequently. The remote server may send suitable credentials to an inventory tracking tag when the remote server determines that the tag is located in the coverage area of a short-range communication network. The tag may then switch back to cellular communications if it detects that it has lost communications with the short-range network.

Figure 1:
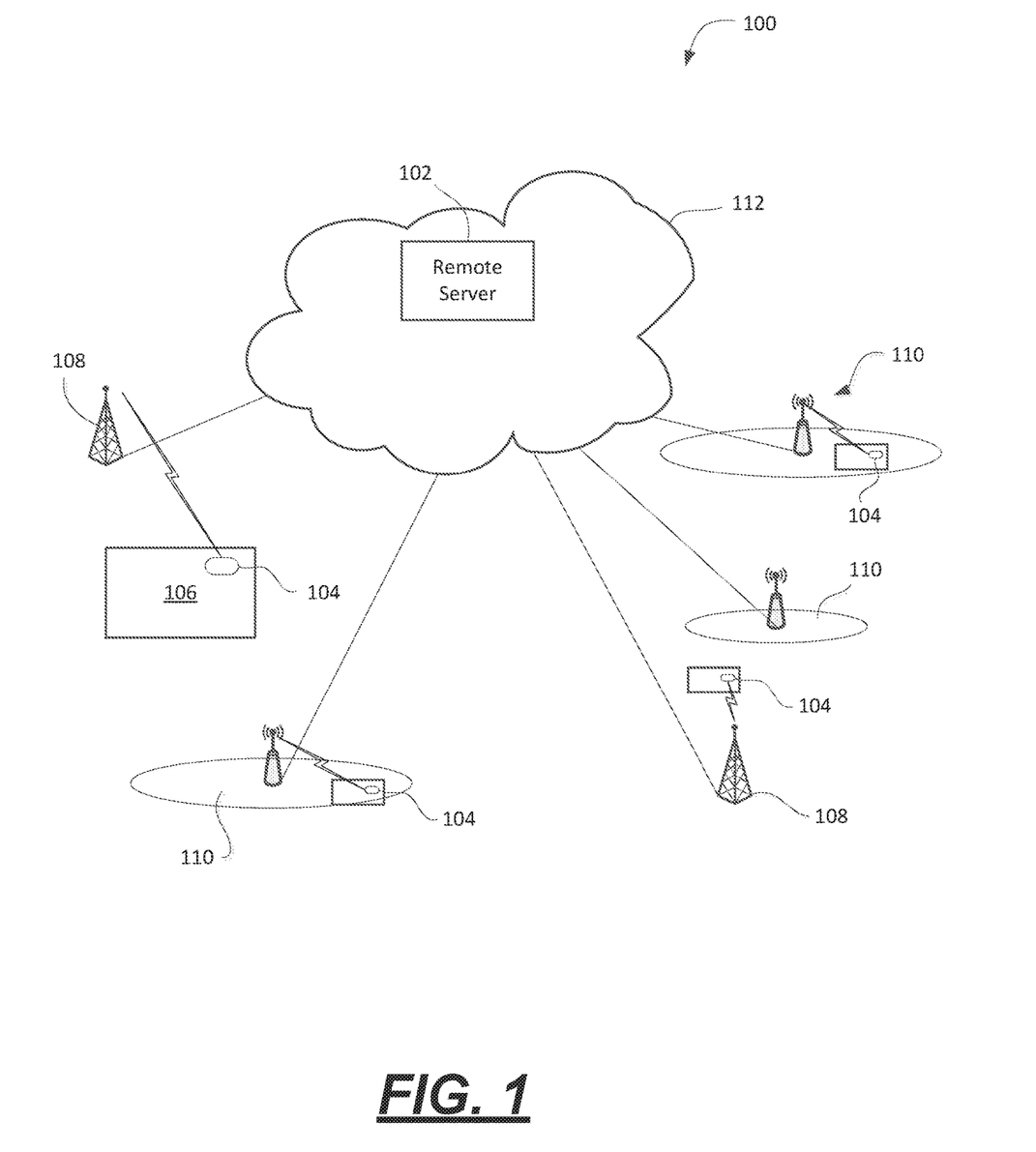
FIG. 1 shows a diagrammatic example of an inventory tracking system.

Reference is now made to FIG. 1 which diagrammatically illustrates an example system 100. The system 100 includes a remote server 102 and a plurality of inventory tracking tags 104. Each inventory tracking tag 104, when deployed and activated, may be attached to or otherwise associated with an inventory item 106.

The inventory tracking tags 104 are configured for wireless communication to the remote server via a plurality of interconnected networks, including, for example, one or more cellular networks 108, one or more short-range communications networks 110, any or all of which may be connected or coupled to a plurality of data communication networks 112 to facilitate the routing of data communications to the remote server 102, and from the remote server 102 to one or more of the inventory tracking tags 104. The plurality of data communication networks 112 may include public and private networks, including the Internet. The short-range communications networks 110 may include, for example, WiFi™ networks, Bluetooth networks, RFID networks, Zigbee™ networks, Sigfox™ networks, LoRaWAN™ networks, or any other such technologies. In some cases, the short-range communications networks 110 include a number of different networks, some of which use different types of communications protocols.

The remote server 102 may store information regarding the short-range communication networks 110 or may have access to a database or other data structure, locally or remotely, that contains information regarding the short-range communication networks 110. The information includes at least some identifying information for the short-range communication network and information regarding coverage. The information may include a geographic location of the network, e.g. a hotspot location. The coverage area information may include a range from the location of the hotspot(s), or may include detailed geographic boundary information defining the coverage area. In some cases, the short-range communication network 110 may include a plurality of access points spread across a campus or other such location, and the information stored at the remote server 102 may include boundary coordinates, a map, a centerpoint and range, or any other form of information specifying the coverage area of the short-range communication network 110.

In some implementations, a short-range communication network 110 may be mobile. That is, the short-range communication network 110 may be mounted to or provided from a vehicle, such as an airplane, train, truck, ferry, ship, etc. In that case, the coverage area information stored in association with the short-range communication network 110 may include identification of the vehicle and/or tracking information for the vehicle. The remote server 102 may obtain information from another source regarding the location of the vehicle to further identify whether the inventory tracking tag 104 is located on the vehicle and, thus, in the coverage area of the short-range communication network 110.

Figure 2:
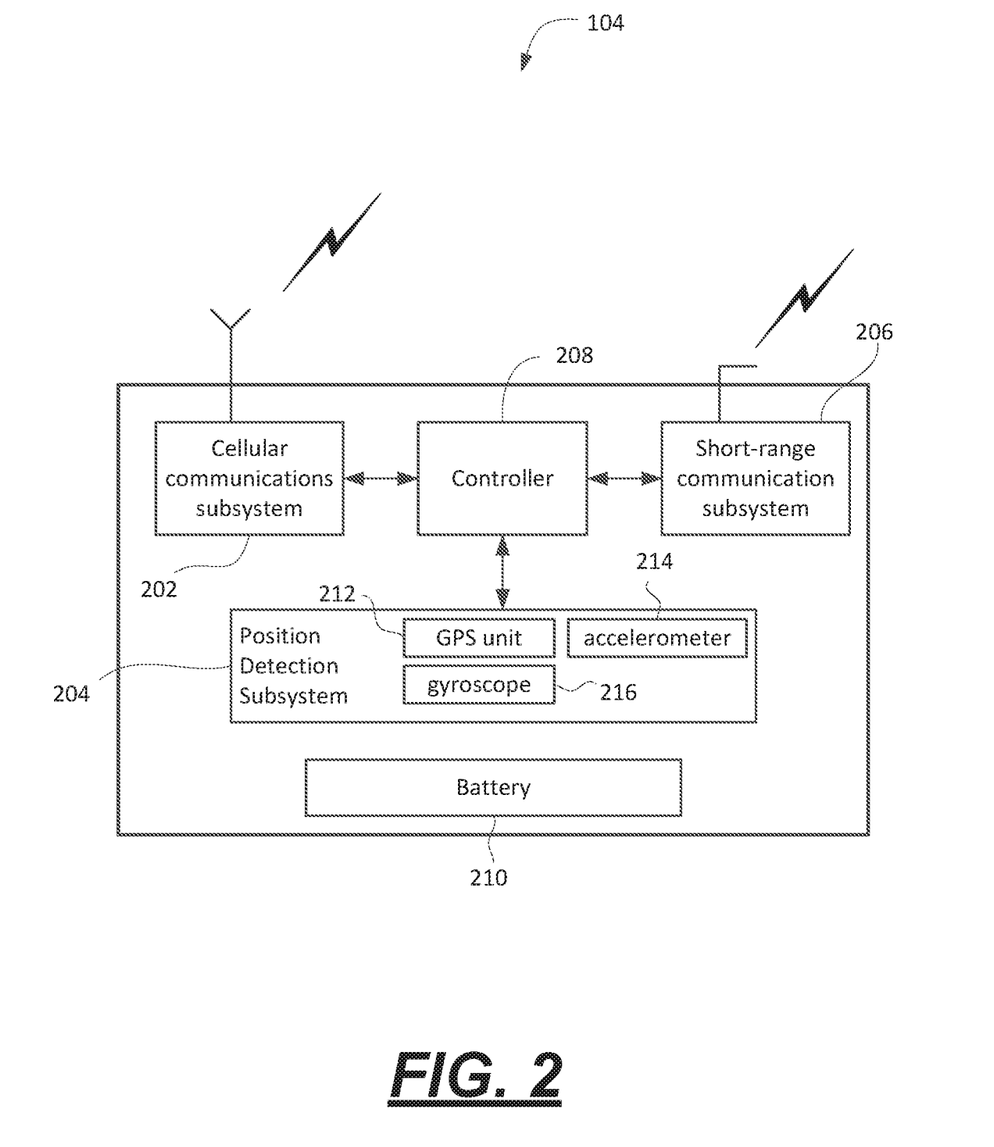
FIG. 2 shows a simplified example of an inventory tracking tag in block diagram form.

Reference is now also made to FIG. 2, which shows, in block diagram form, one example of one of the inventory tracking tags 104. In this example, the inventory tracking tag 104 includes a cellular communications subsystem 202, a position detection subsystem 204, and at least one short-range communications subsystem 206. Each of the subsystems 202, 204, 206 includes a suitable antenna, transceiver, modulator, demodulator, and/or associated components to send and/or receive communications and obtain connectivity with the applicable network using the applicable communications protocol.

The tag 104 may include a controller 208 configured to receive and process data from the various subsystems 202, 204, 206, and to send data and commands to the subsystems 202, 204, 206. For example, the controller 208 may selectively activate or deactivate the cellular communications subsystem 202 or the short-range communications subsystem 206. The controller 208 may received location data determined by the position detection subsystem 204, and may store that data in memory and/or relay that location data to the remote server 102 via either the cellular communications subsystem 202 or the short-range communications subsystem 206. The controller 208 may include a processor and memory. The memory may include stored processors-executable instructions that, when executed by the processor, cause the processor carry out functions described herein. In some cases, the controller 208 may be implemented using a microcontroller, a microprocessor, one or more discrete memory units, an application-specific integrated circuit, or another computing device.

The inventory tracking tag 104 includes a battery 210. The battery 210 is an energy storage device for electrical power. The battery 210 may be rechargeable or single-use. In some cases the inventory tracking tag 104 may include a battery charging circuit to recharge the battery based on solar power, kinetic energy, inductive charging or other potential sources of electrical energy. Example battery types include, but are not limited to, alkaline, lithium, nickel-metal hydride, lithium-ion, and silver oxide.

The position detection subsystem 204 determines or obtains location data for the inventory tracking tag. The location data may include geographic coordinates, such as may be obtained using a GPS unit 212 or the like. In some instances, the location data may be based on signals received from one or more transmitter with identifying or location-related data contained in the signals. In some cases such signals may be received via the cellular communications subsystem 202 and/or the short-range communication subsystem 206. Triangulation or other such techniques may be used to determine position of the inventory tracking tag relative to a plurality of transmitters in some implementations. The position detection subsystem 204 may further include an accelerometer 214 and/or a gyroscope 216 for detecting and measuring movement of the inventory tracking tag 104, which may be used to trigger certain actions or functions, or which may be used in dead reckoning or similar techniques for determining the inventory tracking tag 104 location relative to a starting point.

The controller 208 may be configured to cause the various subsystems 202, 204, 206 to enter a sleep mode to conserve battery 210 power until awoken by signal from the controller 208. The controller 208 itself may have a low power or sleep mode that it enters for a prescribed period of time. The controller 208 may include a local clock and a clock-driven wake up or interrupt signal may cause the controller 208 to exit the low power or sleep mode in order to report location data to the remote server 102.

The controller 208 may periodically obtain location data from the position detection subsystem 204. This may include waking up the position detection subsystem 204 and polling the subsystem 204 for location data.

The controller 208 may then relay that location data to the remote server 102 using the cellular communications subsystem 202. In response, the remote server 102 may transmit a message or signal to the inventory tracking tag 104 via the cellular communications subsystem 202 providing information regarding an available short-range communication network. The controller 208 may store that information in memory and may, at a next reporting interval, select to awaken the short-range communications subsystem 206 in order to report location data. The controller 208 may instruct the short-range communications subsystem 206 to attempt to connect to the short-range communication network based on the stored information. The information regarding the available short-range communication network may include network identifying data, such as an SSID, and/or credentials, such as a password, passphrase, or the like.

If the short-range communications subsystem 206 obtains connectivity and is able to report the location data to the remote server 102, then the controller 208 puts the short-range subsystem 206 back to sleep and will attempt to again connect using the short-range communications subsystem 206 at the next reporting interval. For that purpose it retains the information regarding the short-range communication network in memory.

If the short-range communications subsystem 206 is unable to locate the network or obtain connectivity, then the controller 208 puts the short-range communications subsystem 206 to sleep and awakens the cellular communications subsystem 202 to obtain connectivity to the cellular data network and to report the location data. The controller 208 may further discard the information regarding the short-range communication network as out-of-date since the inventory tracking tag 104 may have moved out of range of the network and/or the credentials may be invalid or expired. If the remote server 102 sends new (or repeated) information regarding an available short-range communication network, then the controller 208 stores that information in memory for use at the next reporting interval.

Figure 3:
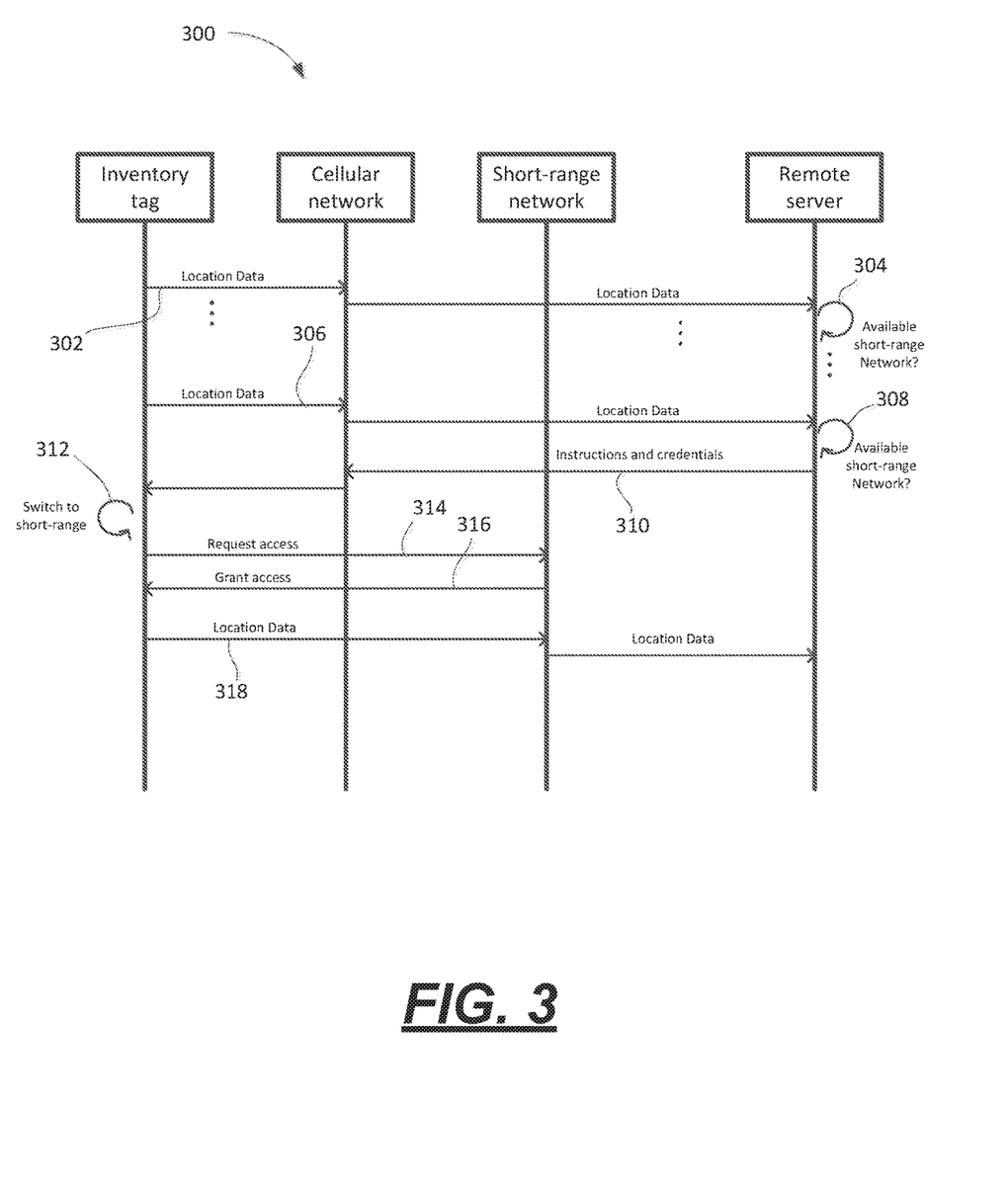
FIG. 3 shows a signal diagram for an example process for prolonging battery life of an inventory tracking tag.

A simplified example signal diagram 300 is shown in FIG. 3. It will be appreciated that the diagram 300 omits many of the handshake operations that occur in establishing connectivity and/or represents them in a simplified manner.

The inventory tracking tag sends location data via the cellular network to the remote server in operation 302. The remote server evaluates whether there is an available short-range system having a coverage area that corresponds to the location of the tag in operation 304. In this case, the remote server does not identify any such system. The tag then enters a sleep mode until the next reporting interval.

In operation 306, the tag again determines its location and sends location data to the remote server via the cellular network. Note that the tag does not scan for available short-range communication networks in its immediate area. To conserve battery power, it waits to be told by the remote server whether it should attempt to use a local short-range communication network. In operation 308, the remote server determines that a suitable short-range communication network has a coverage area in which the tag is located based on the most-recently reported location data from the inventory tracking tag. Accordingly, the remote server sends the tag an instruction message via the cellular network in operation 310, instructing the tag to use the available short-range communication network. In some cases, the message includes credentials for accessing the short-range communication network.

In response to the instruction message, the inventory tracking tag disables its cellular communications subsystem and activates its short-range communications subsystem, as indicated by operation 312. In operation 314, the tag then requests access to the short-range communication network identified by the remote server in the instruction message, which is granted by the short-range communication network in operation 316. It will be understood that these may involve more than one request and response message as the network and the tag engage in a handshake process to establish connectivity but for simplicity is represented by a simple request and response.

The inventory tracking tag then uses the short-range communication network for reporting location data, as indicated by operation 318.

It will be appreciated that the inventory tracking tag may enter a sleep mode between operations 310 and 312, between operations 312 and 314, or between operations 316 and 318, depending on the implementation.

Figure 4:
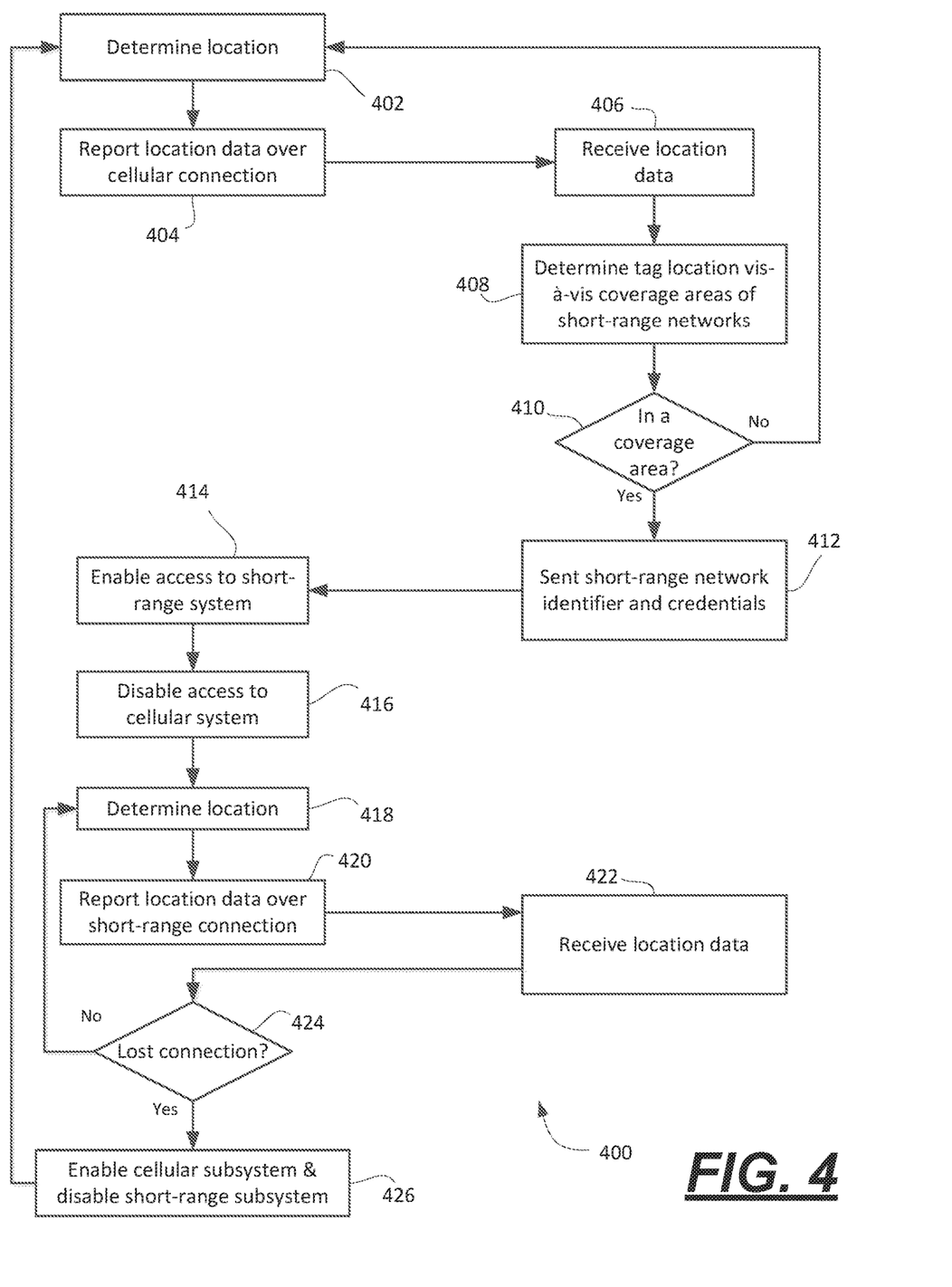
FIG. 4 shows, in flowchart form, another example process for prolonging battery life of an inventory tracking tag.

Reference will now be made to FIG. 4, which shows, in flowchart form, an example process 400 for prolonging battery life of an inventory-tracking tag. As described above, the tag includes a position determining subsystem for determining the tag's location and providing the controller with location data. The controller forwards the location data to the remote server via either the cellular communication subsystem or the short-range communication subsystem. Only one of the communication subsystems is activated at any one time, and the tag does not activate the short-range communication subsystem unless instructed to do so by the remote server.

In operation 402, the tag determines its location. As described above, the tag may do so using, for example, a GPS chip or any other position determining mechanism. The tag then reports location data to the remote server in operation 404. The location data may include, for example, GPS coordinates. To shorten communication length, the location data may be expressed as a differential in GPS coordinates from its last reported location. The location data is reported to the remote server via a cellular data connection that the tag establishes with a cellular network via its cellular communications subsystem.

The remote server receives the location data in operation 406. The remote server then, in operation 408, determines the tag's location from the location data and compares the tag's location to stored information regarding the coverage areas of short-range communication networks in operation 410. The remote server may maintain a database or other data structure detailing short-range communication network over which the tag may communicate. As examples, these networks may include public WiFi hotspots, private WiFi hotspots, private ZigBee networks, etc. In some cases, the networks do not broadcast an SSID. In some cases, the networks require login credentials. This data may be stored at, or accessible to, the remote server. The stored data for the short-range communication networks includes, for each network, coverage area information. In some cases, the coverage area information includes geofence data defining in detail the boundaries of coverage. In some cases, the coverage area information includes a geographic location of the applicable hotspot(s) and its usable range. Other forms of coverage area information may be used by the remote server to determine whether the inventory tracking tag is located within the coverage area of one of the short-range communication networks.

If the tag is not in a coverage area, i.e. no short-range communication network is available in that location, then the process 400 returns to operation 402. It will be appreciated that the description of the process omits various communications that may occurs, such as acknowledgement messages, etc., and that the inventory tracking tag may enter a sleep mode before next reporting its location in operation 402.

If the tag is determined to be located in the coverage area of a short-range communication network in operation 410, then the remote server sends the tag an instruction message to use the short-range communication network in operation 412. The instruction message is sent over the cellular network and may include identifying information and credentials for the short-range communication network. That message is received by the inventory tracking tag and, in response, the inventory tracking tag activates its short-range communication subsystem in operation 414. This may include requesting and obtaining a data connection with the short-range communication network. In operation 416, the cellular communications subsystem is deactivated or disabled to save power.

The inventory tracking tag then, in operation 418, determines its location using whatever functions or algorithms are available through its position detection subsystem. It will be appreciated that the determination of location in operation 402 and the determination of location in operation 418 may differ in some cases. For example, when the inventory tracking tag is connected to the cellular network, it may be able to obtain some location information based on cell tower identities and/or based on signal strength or time-of-arrival techniques for determining location using communications signals with a plurality of known points, such as cell towers. When the inventory tracking tag is disconnected from the cellular communication network, it does not necessarily have those options for determining location. However, if it is connected to the short-range communication network, the access point with which its is connected may provide location information. Given the shorter range of the signals in the short-range communication network, the identity of the access point may give a sufficiently accurate location for the purposes of some embodiments. If further accuracy is desired, then additional techniques may be used for location determination, including, for example, indoor tracking using WiFi fingerprinting, triangulation, or other techniques, some of which may involve communications with a location tracking server communicatively coupled to the short-range communication network. In many embodiments, the location determination occurs using GPS or a similar global navigation satellite system (GNSS). In some implementations, alternative techniques like those described above are utilized if the inventory tracking tag is unable to obtain GPS coordinates, such as if it is in a GPS-denied location, such as inside a complex or facility in which it cannot received GPS signals from the requisite number of satellites to determine its location.

In operation 420, the inventory tracking tag reports its determined location to the remote server over the short-range communication network. The remote server receives and stores that location data in operation 422. In this implementation, because the remote server receives the location data from the inventory tracking tag via the short-range communication network, it does not necessarily perform the functions of operations 408 and 410 to determine whether the inventory tracking tag is in range of a short-range communication system. In other implementations, it may still perform this function and return information regarding available short-range communication networks in the area even if the location data was sent via a short-range communication network. The latter implementation may aid the inventory tracking tag in switching to a more appropriate short-range communication network as it moves, without the necessity of reverting to cellular communications first. The latter implementation may also be used if the remote server is unaware of whether the location data was sent over a cellular or short-range communication network.

In operation 424, the inventory tracking tag assesses whether it has lost or is unable to re-establish its connection to the short-range communication network. In many cases, following operation 420 and 422, the inventory tracking tag enters a sleep mode to conserve power until the next location report is due. In this sleep mode, it may deactivate the short-range communications subsystem to avoid losing battery power while communications are not needed. Accordingly, when it wakes up to re-determine its location and send location data, it attempts to re-establish its connection to the short-range communication network. Operation 424 represents that attempt, and if the attempt is successful, then the inventory tracking tag returns to operation 418 to determine its location.

If the inventory tracking tag cannot re-establish its connection to the short-range communication network, then it will revert to use of the cellular communication network. In operation 426 it enables its cellular communication subsystem and disables its short-range communication subsystem, and returns to operation 402 to determine its location.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of prolonging battery life of an inventory tracking tag, the tag including a battery, a position detection subsystem, a cellular communication subsystem, and a short-range communication subsystem, method comprising:
   determining location data regarding the location of the inventory tracking tag using the position detection subsystem;
   transmitting the location data to a remote server over a cellular data connection using the cellular communication subsystem;
   identifying, by the remote server, based on the location data and stored data regarding short-range communication networks coverage areas, that the inventory tracking tag is located within a first coverage area of a first short-range communication network;
   receiving an instruction message over the cellular data connection from the remote server, the instruction message including information identifying the first short-range communication network; and
   in response to the instruction message,
      disabling the cellular communication subsystem,
      storing the information identifying the first short-range communication network in memory,
      entering a sleep mode, and
      at a next reporting interval:
         enabling the short-range communication subsystem, and
         requesting a connection to the first short-range communication network for the purpose of sending future location reports to the remote server.

2. The method of claim 1, wherein determining location data includes at least one of determining geographic coordinates using a global navigation satellite system, identifying a cellular tower with which the inventory tracking tag is in communication, or performing triangulation based on communications with a plurality of cellular towers.

3. The method of claim 1, wherein the instruction message includes the information identifying the first short-range communication network and credentials for the first short-range communication network, and wherein requesting a connection includes providing the credentials to access the first short-range communication network.

4. The method of claim 1, wherein the short-range communication subsystem does not scan for available networks when the cellular communication subsystem is enabled.

5. The method of claim 1, wherein the first short-range communication network includes one of a WiFi™ network, a Bluetooth network, an RFID network, a Zigbee™ network, a Sigfox™ network, or LoRaWAN™ network.

6. A system comprising an inventory tracking tag and a remote server, the inventory tracking tag comprising:
   a battery;

a position detection subsystem to determine location data regarding the location of the inventory tracking tag;

a cellular communication subsystem to transmit the location data to a remote server over a cellular data connection and to receive an instruction message from the remote server, the instruction message including information identifying a first short-range communication network;

a short-range communication subsystem; and a controller to, in response to the instruction message,
  disable the cellular communication subsystem,
  store the instruction message in memory,
  enter a sleep mode, and
  at a next reporting interval:
    enable the short-range communication subsystem, and
    cause the short-range communication subsystem to connect to the first short-range communication network for the purpose of sending future location reports to the remote serve; and wherein the remote server is configured to identify, based on the location data and stored data regarding short-range communication networks coverage areas, that the inventory tracking tag is located within a first coverage area of the first short-range communication network.

7. The system of claim 6, wherein the position detection subsystem is to determine location data by determining at least one of determining geographic coordinates using a global navigation satellite system, identifying a cellular tower with which the inventory tracking tag is in communication, or performing triangulation based on communications with a plurality of cellular towers.

8. The system of claim 6, wherein the instruction message includes the information identifying the first short-range communication network and credentials for the first short-range communication network, and wherein the controller causes the short-range communication subsystem to request a connection by providing the credentials to access the first short-range communication network.

9. The system of claim 6, wherein the short-range communication subsystem does not scan for available networks when the cellular communication subsystem is enabled.

10. The system of claim 6, wherein the first short-range communication network includes one of a WiFi™ network, a Bluetooth network, an RFID network, a Zigbee™ network, a Sigfox™ network, or LoRaWAN™ network.

* * * * *